United States Patent
Bolouri-Saransar

(10) Patent No.: US 7,006,007 B1
(45) Date of Patent: Feb. 28, 2006

(54) METHOD FOR THE DISTRIBUTION AND TRANSFER OF COMMUNICATION AND MULTIMEDIA SIGNALS, AS WELL AS A SIGNAL DISTRIBUTION ARRANGEMENT FOR THE TRANSFER OF THE COMMUNICATION AND MULTIMEDIA SIGNALS

(75) Inventor: Masud Bolouri-Saransar, Nærum (DK)

(73) Assignee: LK A/S, Ballerup (DK)

( * ) Notice: Subject to any disclaimer, the term of this patent is extended or adjusted under 35 U.S.C. 154(b) by 0 days.

(21) Appl. No.: 09/831,527

(22) PCT Filed: Nov. 19, 1999

(86) PCT No.: PCT/DK99/00637

§ 371 (c)(1),
(2), (4) Date: Jul. 20, 2001

(87) PCT Pub. No.: WO00/31953

PCT Pub. Date: Jun. 2, 2000

(30) Foreign Application Priority Data

Nov. 20, 1998 (DK) .............................. 1998 01530

(51) Int. Cl.
*H04M 1/00* (2006.01)
(52) U.S. Cl. ....................... 340/825.49; 379/16; 398/58
(58) Field of Classification Search ................ 709/230; 370/395.5, 401, 466, 469, 395.6, 395.61, 370/395.62, 395.63, 395.64; 490/487; 340/2.21, 340/2.4, 825.49
See application file for complete search history.

(56) References Cited

U.S. PATENT DOCUMENTS

| | | | |
|---|---|---|---|
| 4,690,491 A | 9/1987 | Stein et al. | 350/96.16 |
| 5,515,037 A | 5/1996 | Wise | 340/825.79 |
| 5,781,728 A | 7/1998 | Rybicki et al. | 395/200.6 |

FOREIGN PATENT DOCUMENTS

| | | |
|---|---|---|
| EP | 0833425 | 4/1998 |
| WO | 9719543 | 5/1997 |

*Primary Examiner*—Michael Horabik
*Assistant Examiner*—Hung Dang
(74) *Attorney, Agent, or Firm*—Ladas & Parry

(57) ABSTRACT

In a method and a signal distribution arrangement for use in private dwellings or offices, communication and multimedia signals are distributed by means of a connection arrangement (27) which is connected to a plurality of terminals (1–8) in the rooms (25, 26) of the dwelling or the office. The individual terminals are preferably identical and may be connected between the terminals and the consuming apparatus via a cable with a plug at each end which is adapted to the terminals and a consuming apparatus, respectively. The signal distribution arrangement includes a plurality of signal processing circuits (31–33) which have wire connections (patch cables) that may be connected to a patch panel (1–23), each of which is either connected to the terminals or is prepared to be connected to the new terminals. Hereby, the power distribution may be adapted to the needs of the individual user in a simple manner at any given occasion without requiring expensive installation changes, as the various signal types may be converted from one signal type or another signal type either in the signal processing circuit or after the terminals.

15 Claims, 2 Drawing Sheets

Figure 1:
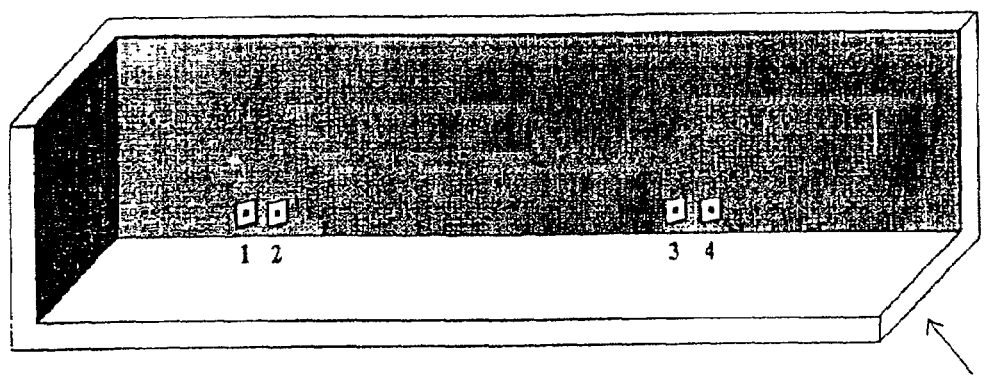

METHOD FOR THE DISTRIBUTION AND TRANSFER OF COMMUNICATION AND MULTIMEDIA SIGNALS, AS WELL AS A SIGNAL DISTRIBUTION ARRANGEMENT FOR THE TRANSFER OF THE COMMUNICATION AND MULTIMEDIA SIGNALS

The invention relates to a method for the distribution and transfer of external communication and multimedia signals, preferably in private dwellings and offices with one or more rooms, wherein the distribution is provided via a central unit connected to a plurality of signal terminals from which the signals may be transferred to receiving installation equipment, and wherein the external signals comprise signals of several different types.

The invention moreover relates to a signal distribution system for the distribution and transfer of external communication and multimedia signals, preferably in private dwellings and offices with one or more rooms, said system comprising a central unit which is adapted to receive the external signals and to distribute these via a data transmission installation to a plurality of terminals in the individual rooms.

Usually, various electrical terminals are installed in private dwellings and offices for ordinary power supply for lighting, refrigerators, etc. In addition, separate terminals for radio and TV signals as well as separate terminals for telephone signals are provided. In offices in particular, there are moreover often terminals for data connections, which may also be installed via a modem to a telephone connection.

With several separate connections, many different terminals are required of course. In practice, terminals for radio, TV, data and telephone, however, have typically just been installed in one, perhaps 2 rooms. The number of this type of terminals must be expected to increase strongly in the dwellings of the future, so that all types of terminals, even in several specimens, are desired in several rooms, which will mean a very comprehensive diversified installation.

Main distribution frames for internal rerouting of identical type signals is generally known from e.g. U.S. Pat. No. 4,690,491. The invention, however, relates to the distribution of several types of external signals via a data transmission installation which would normally not allow propagation of all the signal types which it is desired to distribute.

Accordingly, an object of the invention is to provide a method and a signal distribution system which are more flexible than before in terms of distributing a plurality of different and external signals via a common distribution network in a building.

The object of the invention is achieved by a method of the type stated in the introductory portion of claim 1 which is characterized in that at least one of the signals is converted such that all signals distributed by the transmission belong to a group of signal types, all of which can be transferred effectively via a data main distribution frame and via a transmission installation common to all signals which connects the main distribution frame with said terminals, and that the converted signals are converted back to their original types before the signals are transferred to said installation equipment.

By hereby combining conversion circuits and a main distribution frame it is simple to adapt every terminal to an individual need, and all signal are propagated effectively, because of the conversion, externally and to an arbitrary terminal.

When all the terminals are identical, and plugged cable connections are inserted between the individual terminals and the consuming installation equipment, said plugged cable connections being adapted to the terminals and the consuming installation equipment, the flexibility is enhanced additionally since the number of terminals in a dwelling or an office can be reduced in future.

When separate circuits are inserted in the central unit for the conversion and transfer of data signals, radio/TV signals, telephony in the form of electrical or optical communication signals, it is ensured that all the feed units to routing installations are positioned centrally, which additionally means that it is easier to change signal type in the individual terminals for other applications.

The signal distribution system according to the invention is characterized in that the central unit comprises a plurality of signal adaptation circuits and comprises a patch panel which is connected to the signal adaptation circuit via patch cables, and which is connected to the terminals via the data transmission installation.

Such an arrangement, of course, provides the advantages which are already mentioned above.

To ensure user-friendliness and flexibility, it is an advantage that the circuits contain conversion circuits for the conversion of one signal type to another signal type, and that conversion circuits for back conversion of signals are connected or inserted in the cables between the receiving installation equipment and the terminals, respectively.

With a view to an additionally simple installation structure it is an advantage if the signal distribution system is mounted on a DIN rail, which is preferably countersunk.

Figure 2:
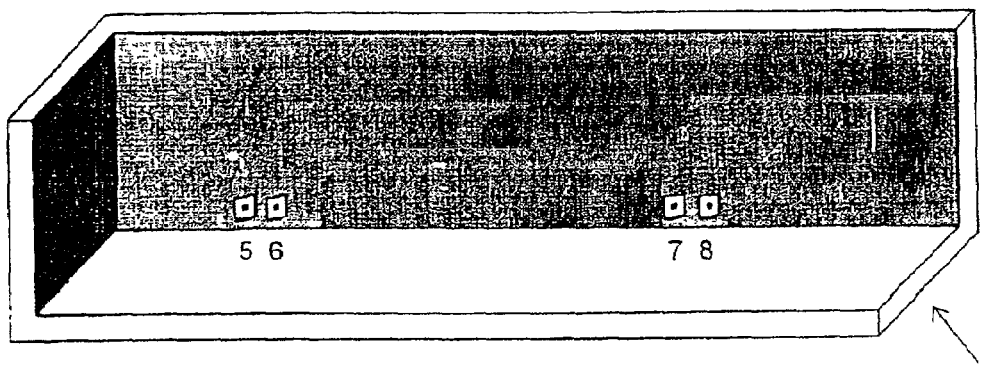
Figure 3:
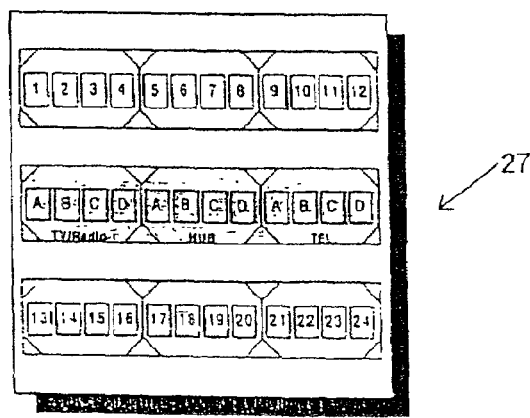
Figure 4:
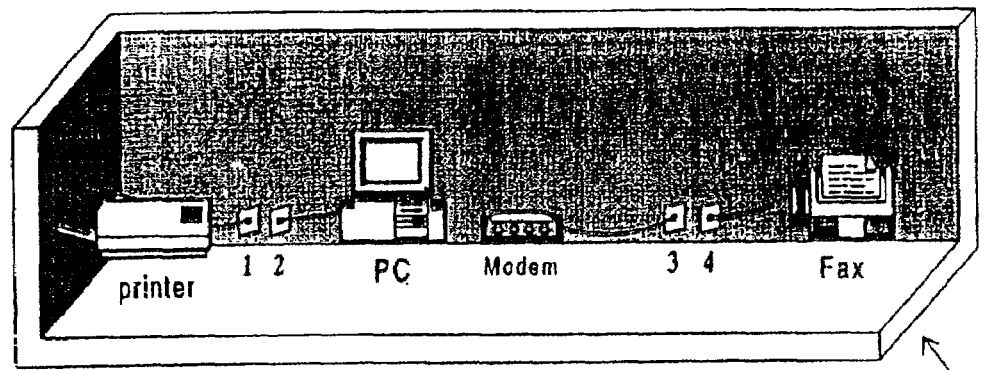
Figure 5:
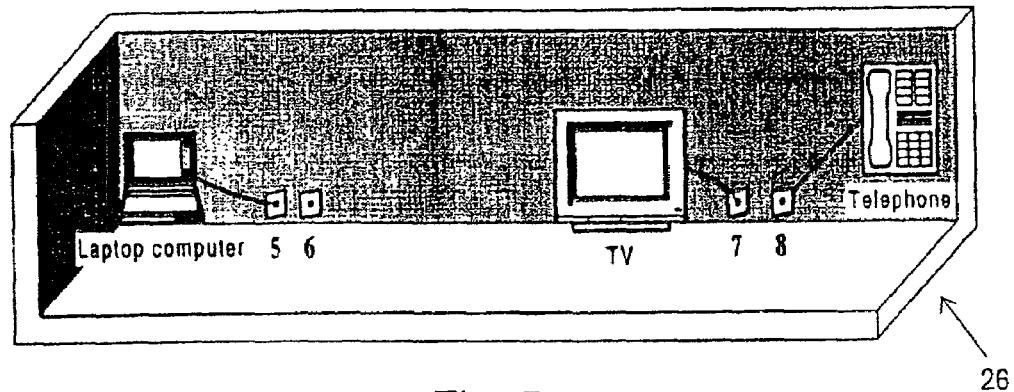
Figure 6:
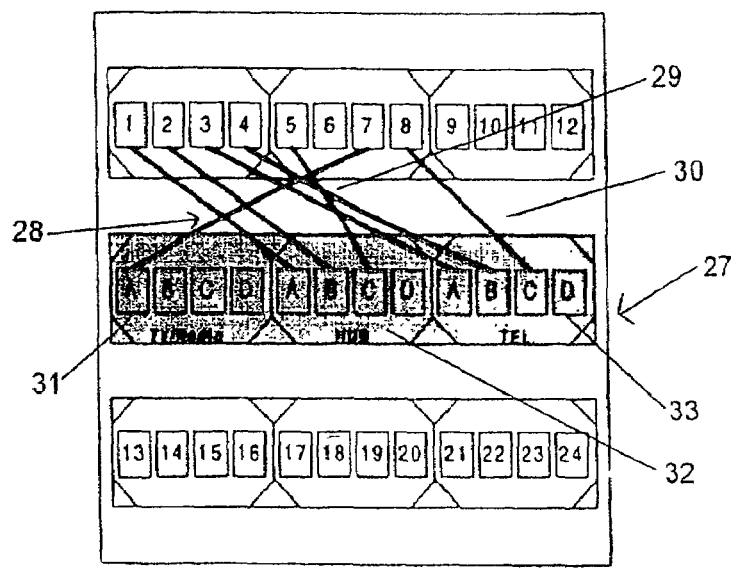

The invention will now be explained more fully with reference to an embodiment shown in the drawing, in which FIGS. 1 and 2 schematically show two rooms with terminals, FIG. 3 shows a signal distribution arrangement according to the invention, FIGS. 4 and 5 show the rooms according to FIGS. 1 and 2 with different installations, and FIG. 6 shows an example of the electrical coupling of the signal distribution arrangement of FIG. 3.

FIGS. 1 and 2 schematically show two rooms with terminals 1–8. The terminals might e.g. be telephone terminals, data connection terminals, radio/TV terminals and the like, depending on the installations desired by a user. Normally, the terminals are provided as fixed installations, each terminal being intended for a task of its own.

FIG. 3 shows a connection arrangement 27 which is adapted for use by implementation of the principles of the invention. The board is provided with electrical signal adaptation circuits A–D and connection points (patch panels) 1–23 for communication signals, whose function will be explained in connection with FIGS. 4–6 below.

FIGS. 4 and 5 again show the same two rooms as are shown in FIGS. 1 and 2, but now equipped with an electrical appliance, such as a modem, a PC, a printer, a fax, a telephone and a TV. This application today requires a number of different types of plug connections for the transfer of communication signals, as is well-known.

It is quite evident that with this prior art it is not easy to change the position of the signal-consuming devices in the rooms, as they are dependent on the positions of the terminals, and/or will require the use of extension wires whose access to precisely a special electrical terminal for special electrical communication signals is required.

According to the invention, the terminals of the rooms for communication and multimedia signals are the same. This means that the individual electrical devices are therefore provided with a wire which fits into every terminal. This wire may either be an extension wire which is connected to the device, or a permanently installed wire in the individual devices.

It should be mentioned in this connection that if all the terminals are e.g. of the coaxial type, which is normally used for the transfer of radio and TV signals, and it is desired to connect a computer, the wire may be provided with a conversion circuit which converts the data signals transferred in the coaxial cable into a form which is adapted precisely to the computer. For example, it may be a matter of converting signals from serial to parallel form.

It should moreover be mentioned that this conversion can also be performed in the main distribution frame board, e.g. if the terminals were data plugs which were to transfer radio and TV signals.

FIG. 6 again shows the main distribution frame board of FIG. 3, but now coupled electrically. As will be seen, the main distribution frame board consists of a number of connection circuits 31–33, here shown as a number of modules, of which the module 31 is a TV/radio module, 32 is a data module, and 33 is a telephone module.

As shown at e.g. the wire communications 28, 29 and 30 (e.g. patch cables which are cables with the same type of plug at each end), the individual terminals are connected to the schematically shown terminal blocks (patch panel) 1–23, the wire 28 being connected to the terminal block 7, the wire 29 to the terminal block 3 and the wire 30 to the terminal block 8.

The terminal blocks 1–23 are connected in full or in part to the terminals 1–8, e.g. as shown in FIGS. 5 and 6. If now a terminal, e.g. the terminal 8 shown in FIG. 3, which is a telephone terminal, is to be used as a radio terminal for antenna signals, this may take place merely by removing the connection 30 shown in FIG. 7 and establishing a connection between the connections of the module 31 and the terminal block 8.

The invention thus provides a new way of coupling installations in private homes and offices, which, in addition to being easy to switch, is future-proof.

For example, nothing prevents an optical transmission from being installed either directly or by means of a fibre which is connected to a circuit for the conversion of optical signals into electrical signals.

What is claimed is:

1. A method for the transfer in a private dwelling or office with one or more rooms of at least one of external communication and multimedia signals to a plurality of signal terminals from which the signals are distributed to receiving installation equipment, wherein the signals comprise differing types of signals, characterized in that at least one of the signals is converted from an original type such that all of the signals being transferred belong to a group of signal types that can be transferred effectively via a data main distribution frame and via a transmission installation that connects the main distribution frame with the terminals, and the at least one of the signals is converted back to the original type before the signals are distributed to the installation equipment.

2. A method according to claim 1, characterized in that patch cables are used for the signal distribution between a plurality of conversion units and a patch panel in the main distribution frame.

3. A method according to claim 1, characterized in that identical terminals are used, and that plugged cable connections are inserted between the individual terminals and the consuming installation equipment, said plugged cable connections being adapted at each end to the terminals and the consuming installation equipment.

4. A method according to claim 1, characterized in that separate circuits are inserted in the central unit for the conversion and transfer of data signals, radio/TV signals, or telephony in the form of electrical or optical communication signals.

5. A signal distribution system according to claim 3, characterized in that the signal adaptation circuits contain conversion circuits for the conversion of one signal type to another signal type.

6. A method according to claim 2, characterized in that identical terminals are used, and that plugged cable connections are inserted between the individual terminals and the consuming installation equipment, said plugged cable connections being adapted at each end to the terminals and the consuming installation equipment.

7. A method according to claim 2, characterized in that separate circuits are inserted in the central unit for the conversion and transfer of data signals, radio/TV signals, or telephony in the form of electrical or optical communication signals.

8. A signal distribution system according to claim 4, characterized in that the signal adaptation circuits contain conversion circuits for the conversion of one signal type to another signal type.

9. In a signal distribution system of a private dwelling or office with one or more rooms for the distribution and transfer of at least one of external communication and multimedia signals via a data transmission installation to a plurality of terminals from which the signals are distributed to receiving installation equipment, wherein the signals comprise differing types of signals, the improvements characterized by a combination of at least one signal adaptation circuit and a patch panel, which is connected to the terminals via the data transmission installation, said signal distribution circuit being adapted to convert a received signal from an original type such that all of the signals being transferred belong to a group of signal types that can be transferred effectively via the transmission installation and converted back to the original type before the signals are distributed to the installation equipment.

10. A signal distribution system according to claim 9, characterized in that the terminals connected to the patch panel are identical, and that the equipment connected to the terminals is connected to the terminals with cables having plug connections adapted to the terminals and the installation.

11. A signal distribution system according to claim 9, characterized in that the circuits are adapted to transfer electrical or optical data, radio/TV or telephone signals.

12. A signal distribution system according to claim 10, characterized in that the signal adaptation circuits contain conversion circuits for the conversion of one signal type to another signal type and further conversion circuits for back conversion of the other signal type to the one signal type are connected or inserted in the cables.

13. A signal distribution system according to claim 9, characterized in that the signal adaptation circuits contain conversion circuits for the conversion of one signal type to another signal type.

14. A signal distribution system according to claim 10, characterized in that the circuits are adapted to transfer electrical or optical data, radio/TV or telephone signals.

15. In a method for the transfer of at least one of external communication and multimedia signals in a private dwelling or office with one or more rooms to a plurality o signal terminals in the private dwelling or office from which the signals are distributed to receiving installation equipment in the private dwelling or office, wherein the signals comprise differing types of signals, the improvements comprising converting at least one of the signals from an original type such that all of the signals being transferred belong to a group of signal types that can be transferred effectively via a data main distribution frame and via a transmission installation that connects the main distribution frame with the terminals, and converting the at least one of the signals back to the original type before the signals are distributed to the installation equipment.

* * * * *

UNITED STATES PATENT AND TRADEMARK OFFICE
CERTIFICATE OF CORRECTION

PATENT NO. : 7,006,007 B1
APPLICATION NO. : 09/831527
DATED : February 28, 2006
INVENTOR(S) : Masud Bolouri-Saransar It is certified that error appears in the above-identified patent and that said Letters Patent is hereby corrected as shown below:

On title page, item 73, "LK" should read -- Schneider Electric Danmark --

Signed and Sealed this

Eighteenth Day of September, 2007

JON W. DUDAS
*Director of the United States Patent and Trademark Office*